United States Patent
Nakagawa et al.

(10) Patent No.: US 9,250,488 B2
(45) Date of Patent: Feb. 2, 2016

(54) DISPLAY DEVICE

(71) Applicant: Japan Display Inc., Tokyo (JP)

(72) Inventors: Atsuo Nakagawa, Tokyo (JP); Eiji Oohira, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 96 days.

(21) Appl. No.: 14/147,690

(22) Filed: Jan. 6, 2014

(65) Prior Publication Data

US 2014/0192309 A1 Jul. 10, 2014

(30) Foreign Application Priority Data

Jan. 7, 2013 (JP) .................................. 2013-000328

(51) Int. Cl.
*G02F 1/1345* (2006.01)
(52) U.S. Cl.
CPC .................................. *G02F 1/13452* (2013.01)
(58) Field of Classification Search
CPC ..................................................... G02F 1/1345
USPC .......................................................... 349/150
See application file for complete search history.

(56) References Cited

U.S. PATENT DOCUMENTS

| | | | | |
|---|---|---|---|---|
| 5,838,412 A | * | 11/1998 | Ueda | G02B 6/0088 349/150 |
| 6,411,353 B1 | * | 6/2002 | Yarita | G02F 1/133308 349/150 |
| 2007/0184675 A1 | * | 8/2007 | Ishikawa | H05K 3/363 439/61 |

FOREIGN PATENT DOCUMENTS

JP 09-138387 5/1997

* cited by examiner

*Primary Examiner* — Sang V Nguyen
(74) *Attorney, Agent, or Firm* — Lowe Hauptman & Ham, LLP

(57) ABSTRACT

The flexible printed circuit board includes a base material with a connection terminal and a signal wiring formed thereon, a first cover layer disposed on a first side of the base material, and a second cover layer disposed on a second side different from the first side. The display panel is connected to the connection terminal. The first cover layer is spaced from an end portion of the display panel by a gap of a predetermined size thereby leaving at least one of the connection terminal and the signal wiring exposed. The second cover layer overlaps with the gap in a planar view. A second end portion of the second cover layer is disposed on an opposite side the display panel. A shape of the second end portion is formed to be wavy or concavo-convex including crests and troughs.

14 Claims, 8 Drawing Sheets

DISPLAY DEVICE

CLAIM OF PRIORITY

The present application claims priority from Japanese Patent Application JP 2013-000328 filed on Jan. 7, 2013, the content of which is hereby incorporated by reference into this application.

BACKGROUND

The present invention relates to a display device and, more particularly, to the structure of a connecting part of a display device for connecting a flexible printed circuit board which inputs control signals to a display panel.

In a prior-art liquid crystal display device, a liquid crystal display panel includes, as shown in FIG. 6, a first substrate SUB1 and a second substrate SUB2 which are disposed to oppose each other via a liquid crystal layer, not shown. On the upper surface of the second substrate SUB2 disposed on the viewer's side, an upper polarization plate POL is attached. A lower polarization plate, not shown, is attached to the first substrate SUB1 disposed on the back side. On the surface on the liquid crystal layer side of the first substrate SUB1, such elements as pixel electrodes and thin-film transistors are formed. A drive circuit DR is mounted in an end portion of the first substrate SUB1. Also, a flexible printed circuit board FPC is electrically connected to the end portion of the first substrate SUB1. Control signals for image display are inputted from the flexible printed circuit board FPC to the drive circuit DR.

The flexible printed circuit board FPC includes a base film BF used as a base material and signal lines of metallic (e.g. copper) thin film are formed on a surface of the base film BF. The signal lines are covered with a cover layer of resin CV1 formed over the surface of the base film BF. The flexible printed circuit board FPC is electrically connected to the first substrate SUB1 via an anisotropic conductive film using connection terminals formed by laminating, for example, nickel (Ni) and gold (Au) over the signal line portions in an area (indicated by dashed-line ellipse B in FIG. 6) where the signal lines are exposed with the cover layer CV1 partly removed.

In a general flexible printed circuit board FPC, a portion, in an area along the end portion of the first substrate SUB1, of the cover layer CV1 is removed leaving the cover layer CV1 with a linear end portion. Therefore, when the flexible printed circuit board FPC is bent, bending points are generated to concentrate in an area along the linear end portion of the cover layer CV1 of the flexible printed circuit board FPC. This first causes the hard and brittle nickel (Ni) layer of the printed circuit board FPC to be broken, eventually causing signal lines to be broken.

As a means of solving the above problem, a liquid crystal display device has been disclosed in Japanese Patent Laid-Open No. H9 (1997)-138387 (Patent Document 1) and a corresponding U.S. Pat. No. 5,838,412 (Patent Document 2). The technique described in the above Patent Documents 1 and 2 is illustrated in FIG. 7 which is an enlarged view of where the flexible printed circuit board is connected to the first substrate SUB1 as seen in the direction of blank arrow P3 in FIG. 6. As shown in ellipse C in FIG. 7, the end portion of the cover layer CV1 is formed to be wavy including crests and troughs so that bending points generated when the flexible printed circuit board FPC is bent are distributed without being concentrated. This prevents the nickel (Ni) layer of the connection terminals and the signal lines formed on the flexible printed circuit board FPC from being broken.

SUMMARY

When the flexible printed circuit board FPC is connected to an end portion of the first substrate SUB1, a gap of about 0.3 mm is required between the end portion of the first substrate SUB1 and the end portion of the cover layer CV1 with the positioning accuracy in connecting them taken into consideration. Therefore, as shown in FIG. 8, in the case of the flexible printed circuit board FPC disclosed in the above Patent Document 1 or 2 in which the cover layer CV1 has a wavy end portion, distance L2 between the portions projecting toward the first substrate SUB1 of the cover layer CV1 and the end portion of the first substrate SUB1 is about 0.3 mm.

Also, to cause the mechanical stresses applied to the end portion of the cover layer CV1 and the bending points generated when the flexible printed circuit board FPC is bent to be distributed, a difference of about 0.3 to 1.0 mm is required between the crests and the troughs of the wavy end portion of the cover layer CV1. Therefore, in the case of the flexible printed circuit board FTC disclosed in the above Patent Document 1, distance L3 between the portions most concave away from the first substrate SUB1 of the wavy end portion of the cover layer CV1 and the end portion of the first substrate SUB1 is about 0.6 to 1.3 mm, causing the connection terminals and signal lines there to be widely exposed. This generates a concern that foreign objects entering the semiconductor frame may cause short-circuiting between mutually adjacent connection terminals or signal lines to result in display failure.

Furthermore, frame part miniaturization for liquid crystal display devices to be mounted on smartphones and tablets have been rapidly progressing with an aim of realizing large display screens within a limitation on the external dimensions of smartphones and tablets, while liquid crystal display devices have been rapidly made thinner so as to facilitate making smartphones and tablets thinner. As frame parts of liquid crystal display devices have been made smaller and liquid crystal display devices have been made thinner, the gap, in each liquid crystal display device, between the frame members disposed to cover the liquid crystal display device and the liquid crystal display panel has also been reduced to be very small. It is, therefore, concerned that exposed signal lines (connection terminals) and conductive frame members (lower frame, in particular) may come into contact to cause display failure.

The present invention has been made in view of the above problems, and it is an object of the present invention to provide technology for preventing short-circuiting in an area covered by no cover layer on a flexible printed circuit board while also preventing wiring breakage caused when the flexible printed circuit board is bent.

(1) To solve the above problems, the present invention provides a display device which includes a display panel and a flexible printed circuit board electrically connected to the display device. The flexible printed circuit board includes a base material with a connection terminal and a signal wiring formed thereon, a first cover layer disposed on a first side of the base material, and a second cover layer disposed on a second side different from the first side of the base material. The connection terminal and the signal wiring are formed on the first side of the base material. The display panel is connected to the connection terminal. The first cover layer disposed on the first side of the substrate is spaced from an end portion of the display panel by a gap of a predetermined size thereby leaving at least one of the connection terminal and the signal wiring exposed. The second cover layer disposed on the second side of the substrate overlaps, in a planar view, with the gap. A first end portion of the first cover layer is disposed on a side of the gap and faces an end side of the display panel. A shape of the first end portion is formed linearly. A second end portion of the second cover layer is disposed on an opposite side the display panel. A shape of the second end portion is formed to be wavy or concavo-convex including crests and troughs. The first end portion is positioned between the crests and the troughs in a planar view.

(2) To solve the above problems, the present invention provides a display device which includes a display panel and a flexible printed circuit board electrically connected to the display device. The flexible printed circuit board includes a base material with a connection terminal and a signal wiring formed thereon, a first cover layer disposed on a first side of the base material, and a second cover layer disposed on a second side different from the first side of the base material. The connection terminal and the signal wiring are formed on the first side of the base material. The display panel is connected to the connection terminal. The first cover layer disposed on the first side of the substrate is spaced from an end portion of the display panel by a gap of a predetermined size thereby leaving at least one of the connection terminal and the signal wiring exposed. The second cover layer disposed on the second side of the substrate overlaps, in a planar view, with the gap. A second end portion of the second cover layer is disposed on an opposite side the display panel. A shape of the second end portion is formed to be wavy or concavo-convex including crests and troughs.

The present invention makes it possible to prevent short-circuiting in an area covered by no cover layer on a flexible printed circuit board while also preventing wiring breakage caused when the flexible printed circuit board is bent.

Other advantageous effects of the present invention will become apparent from the following description.

DESCRIPTION OF THE PREFERRED EMBODIMENTS

Figure 1:
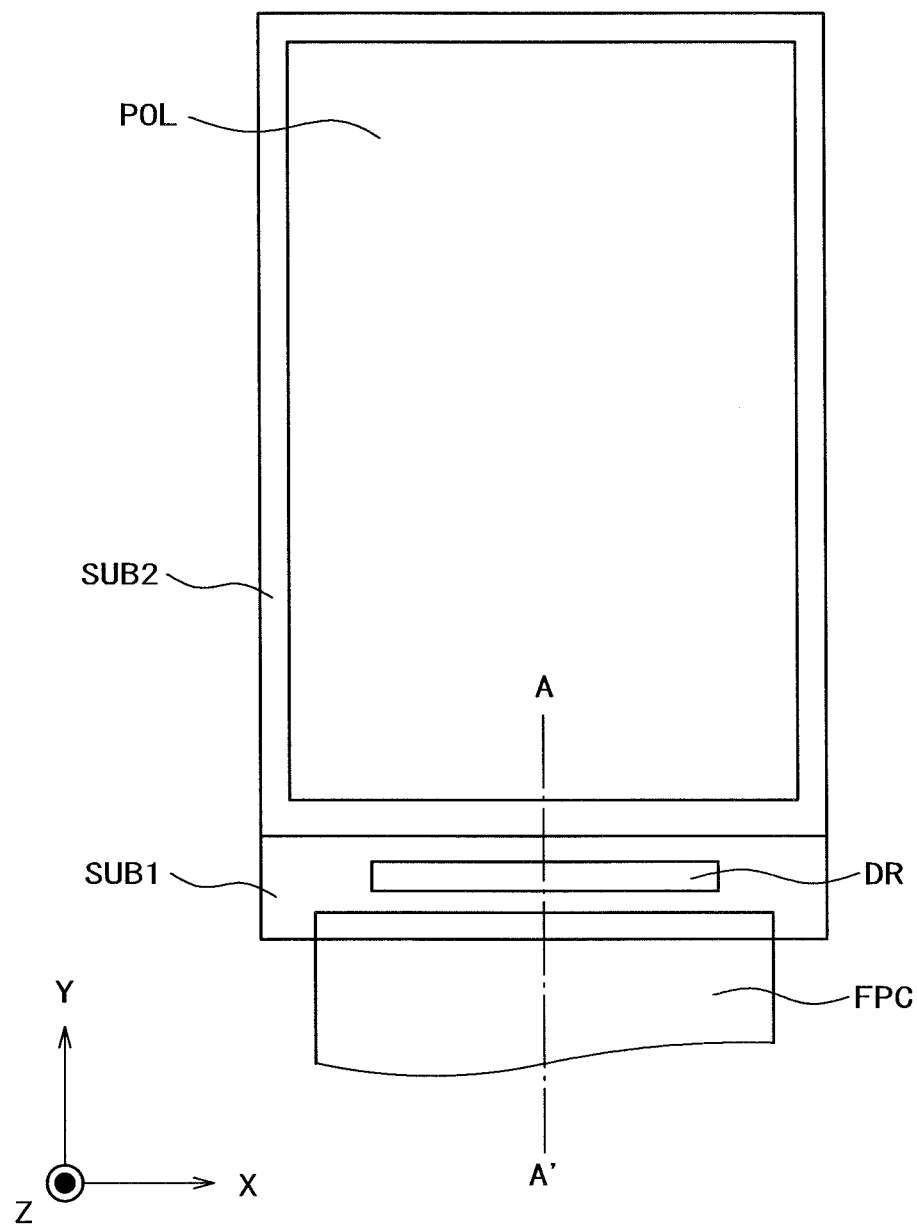
FIG. 1 is a plan view for explaining an approximate structure of a liquid crystal display device according to a first embodiment of the present invention.

Embodiments of the present invention will be described below with reference to drawings. In the following description, like parts will be represented by like reference characters, and duplicated descriptions will be omitted. In the drawings referred to in the following description, X, Y, and Z represent X axis, Y axis, and Z axis, respectively.

First Embodiment

FIG. 1 is a plan view for describing an approximate structure of a liquid crystal display device according to a first embodiment of the present invention. The overall structure of the liquid crystal display device of the first embodiment will be described below based on FIG. 1. The present invention, however, is not limited to liquid crystal display devices and can also be applied to other types of display devices including, for example, organic EL displays. Furthermore, the present invention can also be applied to display devices each provided with a coordinate detecting device (touch panel).

As shown in FIG. 1, the liquid crystal display device of the first embodiment includes a well-known liquid crystal display panel having a display area in which pixels are arranged in a matrix and a well-known backlight unit, not shown, provided on the back side of the liquid crystal display panel. The liquid crystal display panel includes a first substrate (also referred to as a "TFT substrate") SUB 1 on which, for example, well-known thin-film transistors, not shown, are formed and a second substrate (also referred to as a "CF substrate") on which, for example, red (R), green (G), and blue (B) color filters are formed corresponding to the pixels. The first substrate and the second substrate are opposed to each other with a liquid crystal layer, not shown, interposed between them.

On the side opposed to the second substrate SUB2, i.e. the side in contact with the liquid crystal layer, of the first substrate SUB1, plural longitudinally extending video signal lines (drain lines), not shown, and plural transversely extending scanning signal lines (gate lines), not shown, are formed. The areas enclosed between the drain lines and the gate lines are pixel areas. A thin-film transistor, not shown, is disposed near each intersection of a drain line and a gate line. The thin-film transistor is turned on/off by a scanning signal applied thereto through the gate line. When the thin-film transistor is on, a video signal coming through the drain line connected to the drain electrode of the thin-film transistor is outputted to the pixel electrode, not shown, connected to the source electrode of the thin-film transistor.

On the side opposed to the first substrate SUB1, i.e. the side in contact with the liquid crystal layer, of the second substrate SUB2, the R, G, and B color filters are arranged such that they each correspond to a pixel so as to form unit pixels for color display each composed of three (RGB) pixels. As shown in FIG. 1, the second substrate SUB2 is smaller at the lower side thereof than the first substrate SUB1. The surface portion, on the liquid crystal layer side, extending beyond the second substrate SUB2 of the first substrate SUB1 is exposed without being covered by the second substrate SUB2 and is mounted with a drive circuit DR for generating video signals and scanning signals. The first substrate SUB1 has a terminal part formed to be closer to the lower edge thereof than the drive circuit DR. The terminal part is electrically connected with an end portion of a flexible printed circuit board FPC of a first embodiment of the present invention. The first substrate SUB1 has control signals for image display, i.e. control signals for the drive circuit DR, inputted thereto from outside via the flexible printed circuit board FPC. An alternative structure may be adopted in which the drive circuit DR is provided on the flexible printed circuit board FTC or in which an equivalent drive circuit is formed on the first substrate SUB1 using known thin-film transistor formation technology.

The side exposed without being in contact with any liquid crystal layer of each of the first substrate SUB1 and second substrate SUB2 is covered with a known polarization plate POL attached thereto. The polarization plate POL is, as in existing cases, larger than the display area of the liquid crystal display device and entirely covers the display area.

In the liquid crystal display device of the first embodiment of the present invention, the liquid crystal display panel and the backlight unit are held and protected by frame members including a known upper frame and a known lower frame. The upper frame disposed on the liquid crystal display panel side is shaped like a box having an opening corresponding to the display area. The lower frame disposed on the backlight unit side is shaped like a box having, in a side thereof, an opening formed along a side wall surface.

Detailed Structure of Flexible Printed Circuit Board

Figure 2:
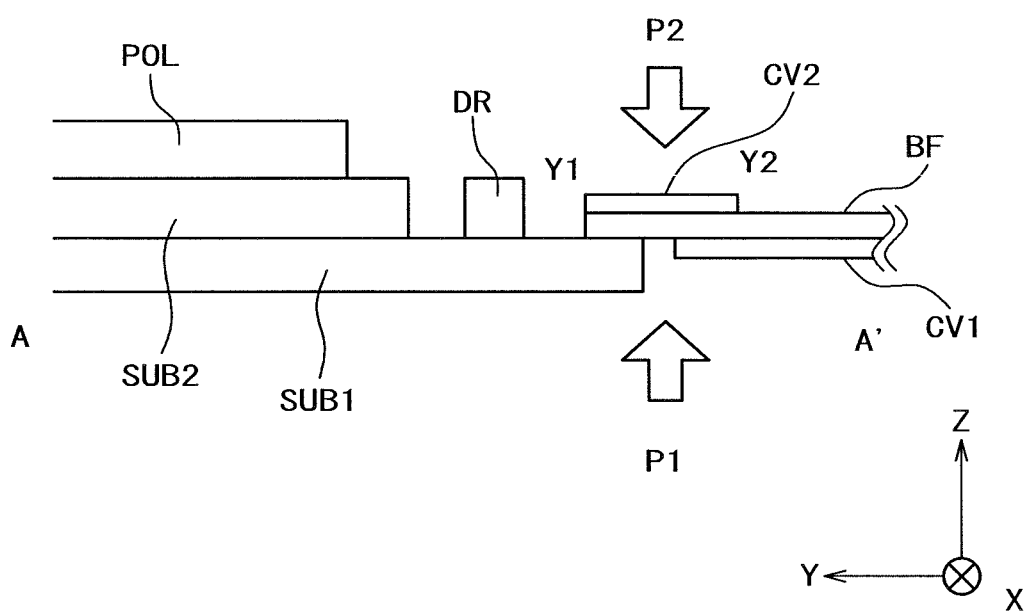
FIG. 2 is a sectional view showing where a flexible printed circuit board FPC and a liquid crystal display panel are connected to each other according to the first embodiment.
Figure 3:
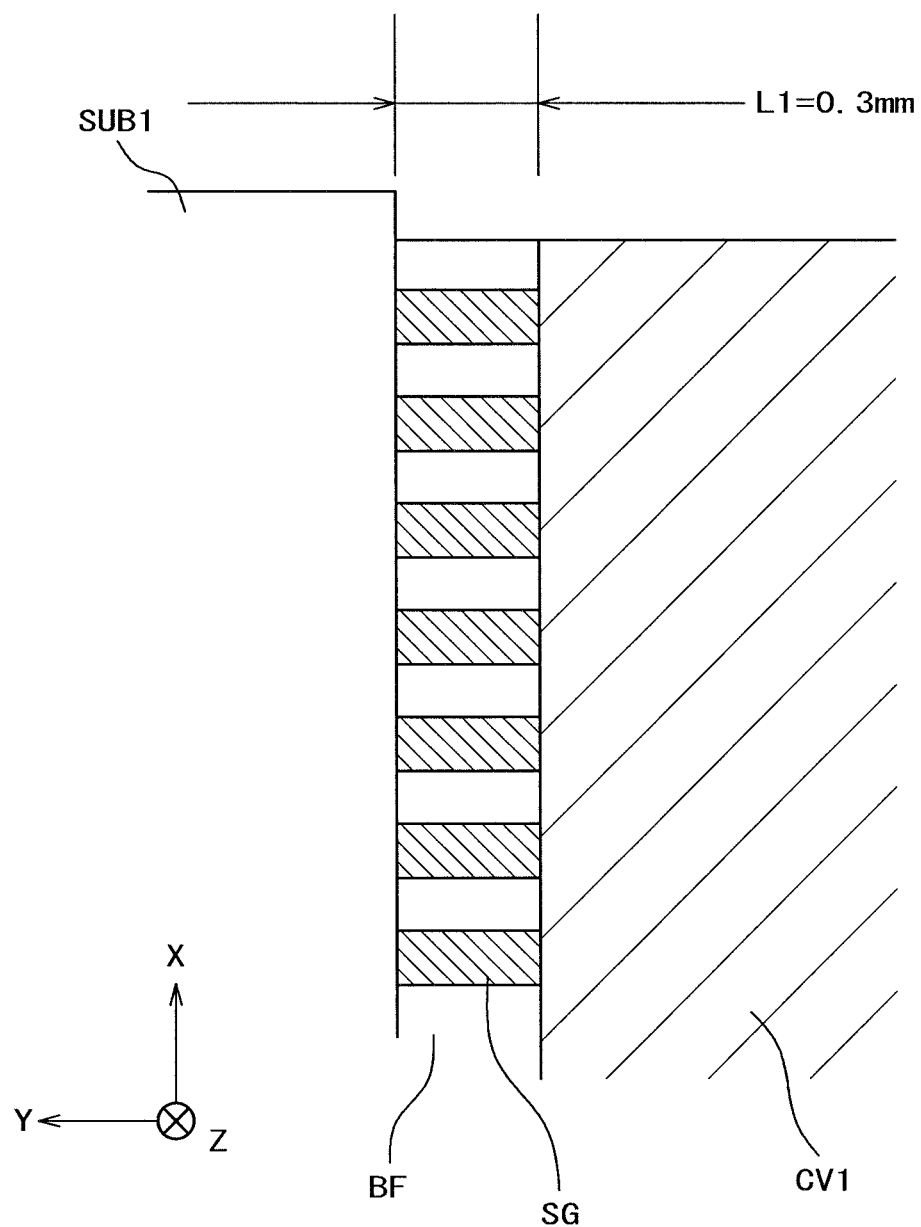
FIG. 3 is a plan view, as seen from the back side, of where the flexible printed circuit board FPC and the liquid crystal display panel are connected to each other according to the first embodiment.
Figure 4:
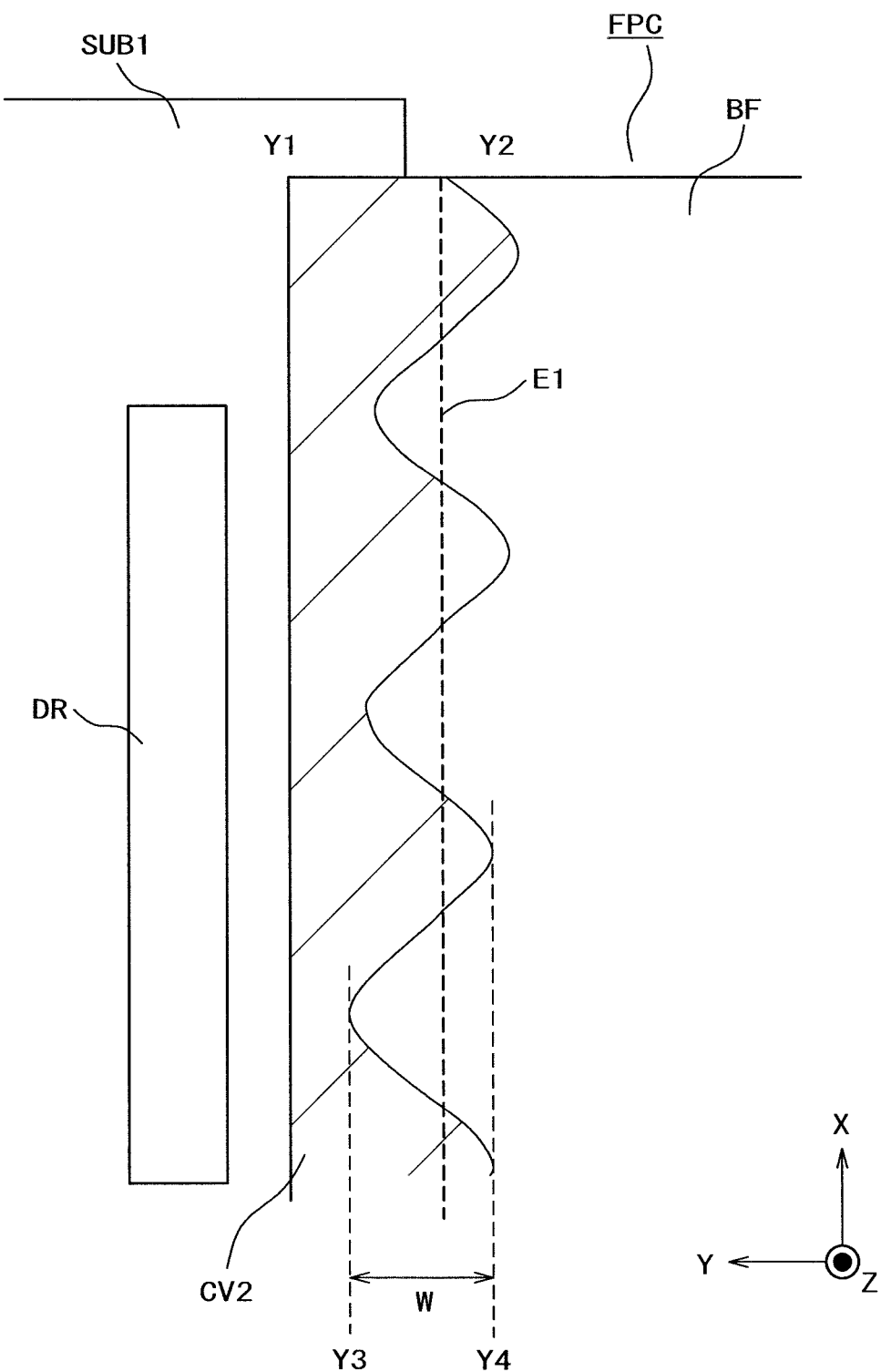
FIG. 4 is a plan view, as seen from the front side, of where the flexible printed circuit board FPC and the liquid crystal display panel are connected to each other according to the first embodiment.

In the following, the structure of the flexible printed circuit board according to the first embodiment of the present invention will be described in detail with reference to FIGS. 2 to 4. FIG. 2 is a sectional view, taken along line A-A' in FIG. 1, showing where the flexible printed circuit board FPC and the liquid crystal display panel are connected to each other according to the first embodiment. FIG. 3 is an enlarged plan view, as seen from the back side (in the direction of blank arrow P1 in FIG. 2), showing where the flexible printed circuit board FPC and the liquid crystal display panel are connected to each other according to the first embodiment. FIG. 4 is an enlarged plan view, as seen from the front side (as seen in the direction of blank arrow P2 in FIG. 2), showing where the flexible printed circuit board FPC and the liquid crystal display panel are connected to each other according to the first embodiment. In FIG. 4, the hatched portion represents a second cover layer CV2.

The flexible printed circuit board FPC of the first embodiment has signal wirings (signal lines), not shown, formed on a side (underside as seen in FIG. 2) of its base film BF made of a known resin material such as polyimide. The base film BF with the signal lines formed thereon is covered with a cover layer (a first cover layer) CV1 for signal line protection and insulation. Where the flexible printed circuit board FPC and the liquid crystal display panel are connected, there is a gap of a predetermined size between the end portion of the liquid crystal display panel and the cover layer CV1, so that the end portion for connection to the liquid crystal display panel of the flexible printed circuit board FPC is not covered by the cover layer CV1. The portions of signal lines on the exposed portion of the flexible printed circuit board FPC are plated with nickel (Ni), then with gold (Au) to be used as connection terminals parallelly arranged along the X-axis direction with each connection terminal extending in the Y-axis direction.

In the first embodiment, where the flexible printed circuit board FPC is connected to the liquid crystal display panel, an end portion (a first end portion) of the cover layer CV1 linearly extends perpendicularly to the direction in which the signal lines (connection terminals) extend. Namely, the end portion of the cover layer CV1 extends along the linear end portion for connection with the flexible printed circuit board FPC of the first substrate SUB1. This makes it possible, when the flexible printed circuit board FPC of the first embodiment is connected to the first substrate SUB1, to maintain a uniform gap L1 between the end portion of the first substrate SUB1 and the end portion of the cover layer CV1 as shown in FIG. 3.

According to the first embodiment, gap L1 is designed to be 0.3 mm by taking into consideration the dimensional accuracy of the flexible printed circuit board FPC and the positioning accuracy in connecting the connection terminals of the flexible printed circuit board FPC to the terminal part of the first substrate SUB1 via a known anisotropic conductive film. In this case, the width in the Y-axis direction of each connection terminal SG or each signal line exposed through the gap L1 equals, at the most, the gap L1 (=0.3 mm) plus an additional gap required to achieve positional alignment for connection. Thus, the width in the Y-axis direction of each connection terminal SG (width in the direction in which the connection terminal SG extends) exposed through the gap between the first substrate SUB1 and the cover layer CV1 can be greatly reduced. This greatly reduces the possibility of short-circuiting between mutually adjacent connection terminals SG, i.e. between signal lines, caused by conductive foreign objects entering the gap while also preventing the connection terminals SG from contacting the lower frame, not shown. As a result, the reliability of the liquid crystal display device is greatly improved. The design value of the gap L1 is not defined to be 0.3 mm. It may be set to an appropriate optional value, for example, depending on the positional accuracy in aligning the flexible printed circuit board FPC and the first substrate SUB1.

According to the first embodiment, as shown in FIG. 2, on the side not opposing the first substrate SUB1 of the base film BF formed over the flexible printed circuit board FTC, the second cover layer CV2 is formed. The second cover layer CV2 is made of a resin material similar to that used for the cover layer CV1 and is attached to the surface of the base film BF via a known adhesive layer. The second cover layer CV2 is formed such that, as shown in FIG. 2, the end portion thereof on the Y1 side (a first edge) is flush with the corresponding edge of the flexible printed circuit board FPC. The end portion on the Y2 side (a second end portion) of the second cover layer CV2 partially overlaps, in a planar view, with an end portion of the cover layer CV1.

As shown in detail in FIG. 4, the end portion on the Y2 side of the second cover layer CV2 is formed to be wavy including convex portions (crests) which are convex toward the Y2 side and concave portions (troughs) which are concave toward the Y1 side. The crests are convex to position Y4 and the troughs are concave to position Y3. The crests and the troughs are alternately formed in the direction (X-axis direction) perpendicular to the direction (Y-axis direction) in which the connection terminals SG extend. The end portion on the Y2 side of the second cover layer CV2 need not necessarily be wavy. It may be formed to be concavo-convex including plural linear parts, not shown. Also, in a planar view, the end portion (indicated by dashed line E1 in FIG. 4) of the cover layer CV1 formed over the opposite side of the base film BF is positioned in the range W being the range between the troughs formed at position Y3 of the concave portions of the second cover layer CV2 and the crests formed at position Y4 of the convex portions of the second cover layer CV2. Namely, according to the first embodiment, only the end portion on the Y2 side of the second cover layer CV2 is formed to be wavy, whereas the other three end or side portions of the second cover layer CV2 are formed to extend along the end portion on the Y1 side and the two side portions of the flexible printed circuit board FPC. Also, according to the first embodiment, the cover layer CV1 and the second cover layer CV2 of the flexible printed circuit board FPC are made of a same resin material and have a same thickness.

As described above, according to the first embodiment, the second cover layer CV2 includes portions overlapping, in a planar view, with a part of the cover layer CV1 and other portions overlapping, in a planar view, with no part of the cover layer CV1 with such overlapping portions and not-overlapping portions formed to alternate along the linear end portion (indicated by dashed line E1 in FIG. 4) of the cover layer CV1. Therefore, the mechanical stresses and bending points generated, when the flexible printed circuit board FPC is bent near a connecting portion, in an area thereof near the end portion of the cover layer CV1 are distributed over a wider area. As a result, the signal lines are made more resistant to breakage when they are bent. Namely, signal line breakage caused when the signal lines are bent can be prevented.

Generally, the mechanical stresses generated when the flexible printed circuit board FPC is bent tend to concentrate on an area extending along the linear end portion of the cover layer CV1. With the linear end portion of the cover layer CV1 overlapped with the wavy end portion of the second cover layer CV2, however, the mechanical stresses generated when the flexible printed circuit board FPC is bent are distributed along the wavy end portion of the second cover layer CV2 without being concentrated in an area extending along the linear end portion of the cover layer CV1. This causes the bending points generated when the flexible printed circuit board FPC is bent to be also distributed over a wider area. Hence, the signal lines are made more resistant to breakage when they are bent, so that signal line breakage caused when the signal lines are bent can be prevented. Particularly, the signal lines are made more resistant to breakage caused when the flexible printed circuit board FPC is repeatedly bent.

It, therefore, becomes possible to prevent short-circuiting between connection terminals SG and between signal lines in the terminal part not covered by the cover layer CV1 of the flexible printed circuit board FPC and also to prevent wiring breakage in the flexible printed circuit board FPC. This greatly improves the reliability of the liquid crystal display device. The above-described structure of the first embodiment is particularly effective in preventing wiring breakage in the flexible printed circuit board FPC in cases where the flexible printed circuit board FPC having connection terminals plated with hard and brittle nickel is bent repeatedly.

Figure 8:
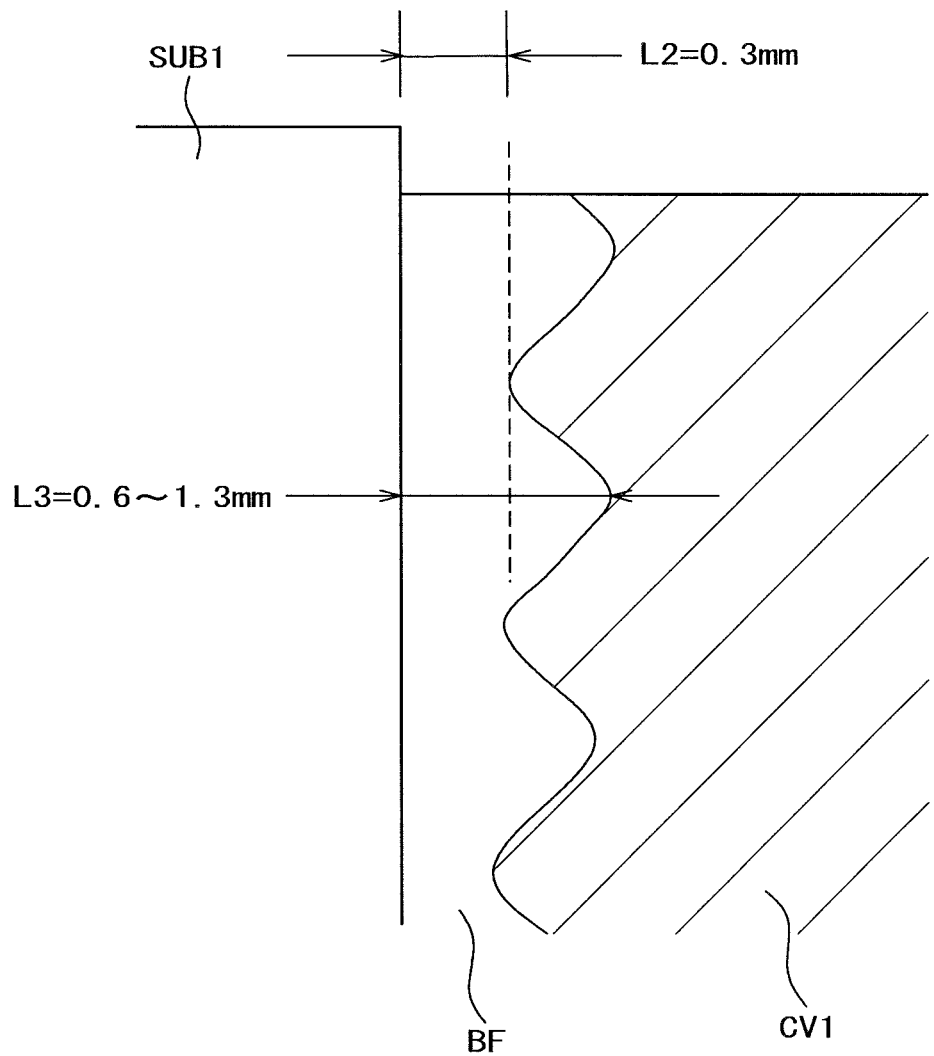
FIG. 8 is an enlarged plan view of a connecting part of a prior-art flexible printed circuit board.

According to the first embodiment, the flexible printed circuit board FPC includes the second cover layer CV2 having a wavy end portion and being disposed on the side where no signal lines are formed of the base film BF. Therefore, in the first embodiment, it does not occur that, as shown in FIG. 8, the widths of exposure of the connection terminals SG vary depending on the waveform of the wavy end portion of the second cover layer CV2. Namely, a special effect can be obtained which can prevent short-circuiting between mutually adjacent connection terminals or between mutually adjacent signal lines caused by conductive foreign objects caught by widely exposed portions of the connection terminals SG or signal lines.

Even though, according to the first embodiment, the end portion (indicated by dashed line E1 in FIG. 4) of the cover layer CV1 is positioned, in a planar view, between the troughs (at position Y3) of the concave portions of the second cover layer CV2 and the crests (at position Y4) of the convex portions of the second cover layer CV2, an alternative structure may be adopted in which both the troughs at position Y3 of the concave portions and the crests at position Y4 of the convex portions of the second cover layer CV2 are formed on the wiring side off the end portion of the cover layer CV1.

Also, the flexible printed circuit board FPC of the first embodiment is not limited to a flexible single-sided printed circuit board. It may be a double-sided flexible printed circuit board having signal lines formed on both sides of the base film BF or a multi-layered flexible printed circuit board. When using a double-sided flexible printed circuit board, however, it is desirable to provide the cover layer CV1 on both sides of the base film BF and further provide, on the side where the connection terminals SG are not exposed, the second cover layer CV2 of the present invention so as to cover the upper surface of the cover layer CV1 (the upper surface of the end portion on the liquid crystal display panel side).

Second Embodiment

Figure 5:
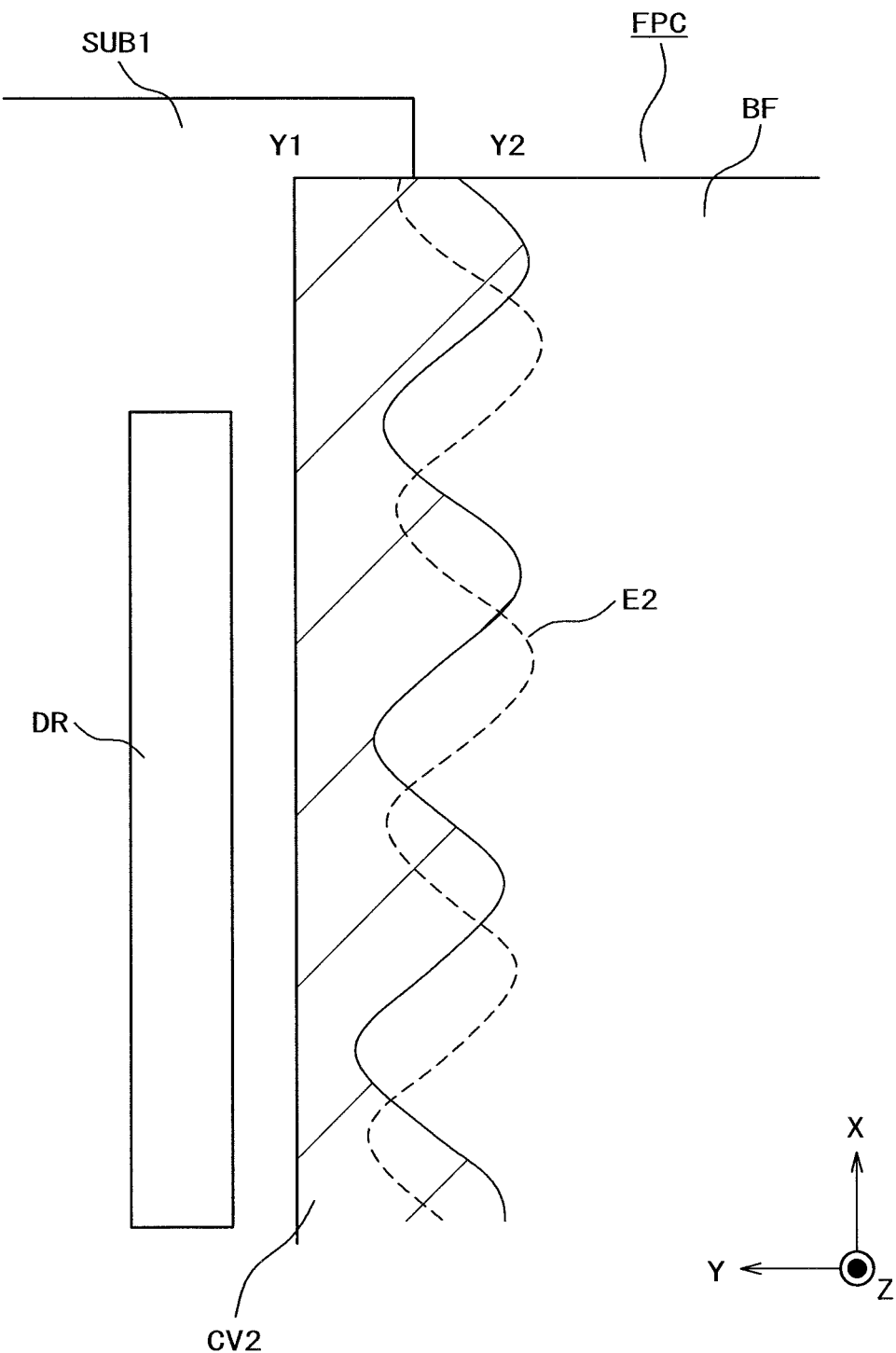
FIG. 5 is a plan view for explaining an approximate structure of a flexible printed circuit board included in a liquid crystal display device according to a second embodiment of the present invention.
Figure 6:
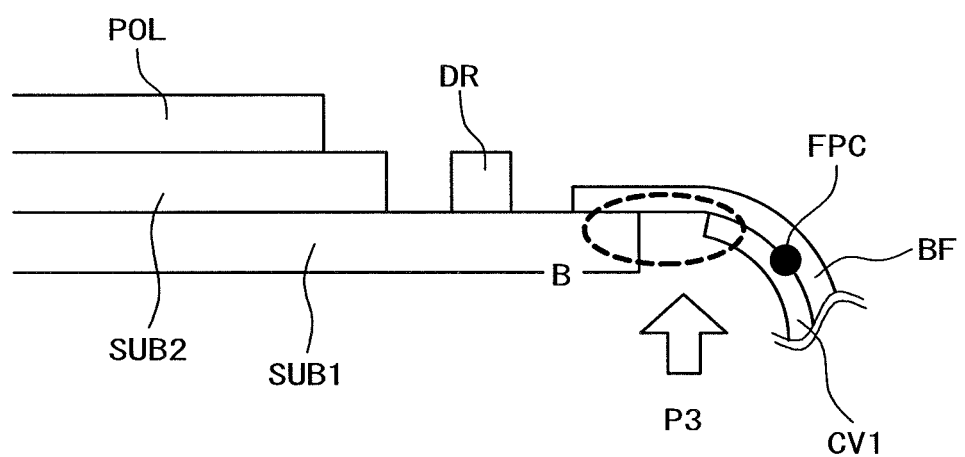
FIG. 6 is a sectional view for explaining an approximate structure of a prior-art liquid crystal display device.

FIG. 5 corresponding to FIG. 4 for the first embodiment is a plan view for explaining an approximate structure of a flexible printed circuit board included in a liquid crystal display device according to a second embodiment of the present invention. The liquid crystal display device of the second embodiment differs from the liquid crystal display device of the first embodiment in the structures of cover layers CV1 and CV2 formed to cover surfaces of the flexible printed circuit board FPC. In the other respects, the liquid crystal display devices of the first and second embodiments of the present invention are identical to each other. In the following, the cover layer CV1 and the second cover layer CV2 according to the second embodiment will be described in detail.

Figure 7:
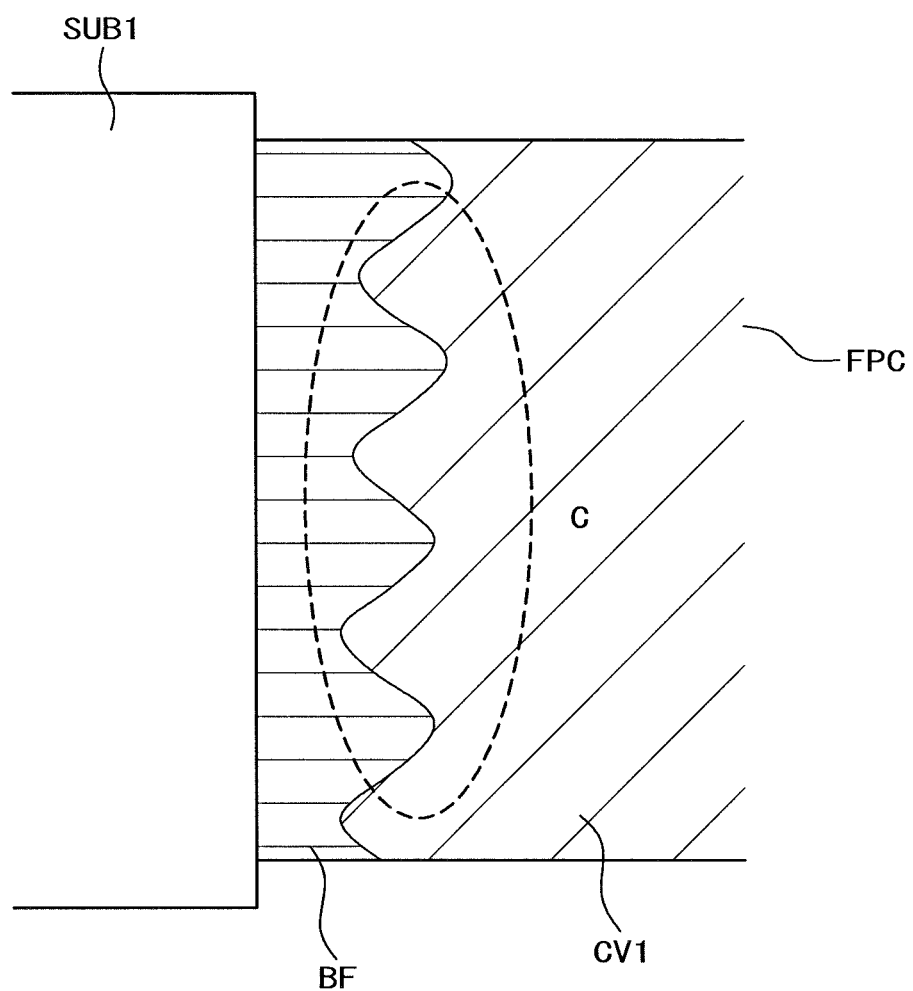
FIG. 7 is an enlarged view of where a flexible printed circuit board is connected to a first substrate SUB1 as seen in the direction of blank arrow P3 in FIG. 6.

As shown in FIG. 5, in the flexible printed circuit board FPC of the second embodiment, too, the second cover layer CV2 to be formed over the upper side, i.e. the side with no signal lines formed thereon, of the base film BF (base material) has a wavy end portion as in the first embodiment. Additionally, in the flexible printed circuit board FPC of the second embodiment, the cover layer CV1 to be formed over the underside, i.e. the side with signal lines formed thereon, of the base film BF also has a wavy end portion (indicated by dashed line E2 in FIG. 5) similar to that of the second cover layer CV2. Namely, the cover layer CV1 of the flexible printed circuit board FPC of the second embodiment is shaped similarly to a prior-art cover layer CV1 shown in FIG. 7.

In the flexible printed circuit board FPC of the second embodiment structured as described above, the cover layer CV1 and the second cover layer CV2 both having a wavy end portion cause the mechanical stresses generated when the flexible printed circuit board FPC is bent to be distributed to achieve a greater stress distribution effect. Hence, the effect of bending point distribution is also enhanced. This generates a special effect of making the signal lines more resistant to breakage caused when the flexible printed circuit board FPC is bent. With the signal lines made more resistant to breakage, the reliability of the liquid crystal display device is further increased.

In the flexible printed circuit board FPC of the second embodiment, the wavy end portions of the cover layer CV1 and the second cover layer CV2 are identical in terms of the pitch of the convex portions or concave portions (the distance in the X-axis direction between convex portions or between concave portions) and the magnitude of waveform (the height in the Y-axis direction of convex/the depth in the Y-axis direction of concave portion). Also, in a planar view, the waveforms of the wavy end portions of the cover layer CV1 and the second cover layer CV2 are shifted from each other by one fourth of the pitch in the X-axis direction. In this way, the intersections, in a planar view, between the cover layer CV1 and the second cover layer CV2 are prevented from being linearly aligned.

The stresses generated in the flexible printed circuit board FPC are concentrated more on where the cover layer CV1 and the second cover layer CV2 intersect in a planar view than on where they do not intersect. In the flexible circuit board FPC of the second embodiment, the intersections, in a planar view, between the cover layer CV1 and the second cover layer CV2 where stresses concentrate are not linearly aligned. Namely, the stresses concentrating on the intersections in a planar view between the cover layer CV1 and the second cover layer CV2 when the flexible printed circuit board FTC is bent are distributed over a wider area than in cases where such intersections are linearly aligned. This causes the bending points of the flexible printed circuit board FPC to be also distributed more widely. As a result, the signal lines formed on the flexible printed circuit board FPC of the second embodiment are made more resistant to breakage caused when the flexible printed circuit board FPC is repeatedly bent, and the reliability of the liquid crystal device using the flexible printed circuit board FTC of the second embodiment is further increased.

In the flexible printed circuit board FTC of the second embodiment described above, the wavy end portions of the cover layer CV1 and the second cover layer CV2 are identical in terms of the pitch of the convex portions or concave portions (the distance in the X-axis direction between convex portions or between concave portions) and the magnitude of waveform in the Y-axis direction (the height in the Y-axis direction of convex/the depth in the Y-axis direction of concave portion). Also, in a planar view, the waveforms of the wavy end portions of the cover layer CV1 and the second cover layer CV2 are shifted from each other by one fourth of the pitch in the X-axis direction. However, the relationships between the wavy end portions of the cover layer CV1 and the second cover layer CV2 need not necessarily be as described above.

Also, in the flexible printed circuit board FTC of the second embodiment described above, the second cover layer CV2 is formed such that, in the Y-axis direction, the middle position between the position of each concave portion and the position of each convex portion of the wavy end portion of the cover layer CV1 coincides, in the Y-axis direction, with the middle position between the position of each concave portion and the position of each convex portion of the wavy end portion of the second cover layer CV2. However, the relationship between the middle position between the position of each concave portion and the position of each convex portion of the wavy end portion of the cover layer CV1 and that of the wavy end portion of the second cover layer CV2 need not necessarily be as described above. For example, the middle position between the position of each concave portion and the position of each convex portion of the wavy end portion of the cover layer CV1 may be shifted, in the Y-axis direction, from that of the wavy end portion of the second cover layer CV2.

Also, in the flexible printed circuit board FPC of each of the first and second embodiments described above, each convex portion and each concave portion of the wavy end portion of the second cover layer CV2 partially overlapping with the cover layer CV1 are identical in size. However, the convex portions and the concave portions of the wavy end portion of the second cover layer CV2 need not necessarily be identical in size. They may differ in size from each other and, furthermore, the size may even vary between the convex portions and also between the concave portions of the wavy end portion of the second cover layer CV2.

The invention made by the present inventors has been concretely described based on the above embodiments, but the present invention is not limited to the above embodiments and can be modified in various ways without departing from the scope of the present invention.

What is claimed is:

1. A display device comprising a display panel and a flexible printed circuit board electrically connected to the display device, the flexible printed circuit board including a base material with a connection terminal and a signal wiring formed thereon, a first cover layer disposed on a first side of the base material, and a second cover layer disposed on a second side different from the first side of the base material,
   wherein the connection terminal and the signal wiring are formed on the first side of the base material;
   the display panel is connected to the connection terminal;
   the first cover layer is spaced from an end portion of the display panel by a gap of a predetermined size thereby leaving at least one of the connection terminal and the signal wiring exposed;
   the second cover layer overlaps with the gap in a planar view;
   a first end portion of the first cover layer is disposed on a side of the gap and faces an end side of the display panel;
   a shape of the first end portion is formed linearly;
   a second end portion of the second cover layer is disposed on an opposite side the display panel;
   a shape of the second end portion is formed to be wavy or concavo-convex including crests and troughs, and
   the first end portion is positioned between the crests and the troughs in a planar view.

2. A display device comprising a display panel and a flexible printed circuit board electrically connected to the display device, the flexible printed circuit board including a base material with a connection terminal and a signal wiring formed thereon, a first cover layer disposed on a first side of the base material, and a second cover layer disposed on a second side different from the first side of the base material,
   wherein the connection terminal and the signal wiring are formed on the first side of the base material;
   the display panel is connected to the connection terminal;
   the first cover layer is spaced from an end portion of the display panel by a gap of a predetermined size thereby leaving at least one of the connection terminal and the signal wiring exposed;
   the second cover layer overlaps with the gap in a planar view;
   a second end portion of the second cover layer is disposed on an opposite side the display panel and to extend over an edge of the display panel in a planar view, and
   a shape of the second end portion is formed to be wavy or concavo-convex including crests and troughs.

3. The display device according to claim 2, wherein a first end portion of the first cover layer is disposed on a side of the gap and faces an end side of the display panel;
   a shape of the first end portion is formed linearly.

4. The display device according to claim 2, wherein a first end portion of the first cover layer is disposed on a side of the gap and positioned between the crests and the troughs in a planar view.

5. The display device according to claim 2, wherein a first end portion of the first cover layer is disposed on a side of the gap and overlaps with the second cover layer in a planar view, wherein the ultraviolet curable material is formed at a side adjacent to the terminal portion.

6. The display device according to claim 2, wherein a first end portion of the first cover layer is disposed on a side of the gap;
   a shape of the first end portion is formed to be wavy or concavo-convex including crests and troughs, and
   an area including the crests and troughs of the first end portion and an area including the crests and troughs of the second end portion are superposed with each other in a planar view.

7. The display device according to claim 6, wherein the crests of the first end portion and the crests of the second end portion are shifted from each other in a planar view.

8. The display device according to claim 7, wherein a wave form or a concavo-convex form of the first end portion has a first pitch and a wave form or a concavo-convex form of the second end portion has a second pitch, the first pitch and the second pitch being shifted from each other by a predetermined distance.

9. The display device according to claim 7, wherein a wave form or a concavo-convex form of the first end portion has a first pitch and a wave form or a concavo-convex form of the second end portion has a second pitch, the first pitch and the second pitch being a same pitch.

10. The display device according to claim 9, wherein the crests of the first end portion and the crests of the second end portion are shifted from each other by one fourth of the same pitch in a planar view.

11. The display device according to claim 3, wherein the first end portion is positioned between the crests and the troughs of the second end portion in a planar view.

12. The display device according to claim 3, wherein the first end portion overlaps with the second cover layer in a planar view.

13. The display device according to claim 2, wherein the display panel has a first substrate, a second substrate, and a liquid crystal.

14. The display device according to claim 13, further comprising a backlight unit.

* * * * *